3,087,196
METHOD OF SLAUGHTERING ANIMALS

Jack A. Crockford, Chamblee, and Frank A. Hayes, Athens, Ga., Seldon D. Feurt, Memphis, Tenn., and James H. Jenkins, Athens, and Harold C. Palmer, Atlanta, Ga., assignors to Palmer Chemical & Equipment Co., Inc., Atlanta, Ga., a corporation of Georgia
No Drawing. Filed Mar. 9, 1961, Ser. No. 94,416
3 Claims. (Cl. 17—45)

This invention relates to a humane method of slaughtering animals which permits an animal to be slaughtered in accordance with health and ritualistic requirements but, at the same time, avoids the torture to an animal involved in conventional methods of slaughter.

The invention may be briefly described as comprising the steps of injecting the animal with a metabolizable paralyzing drug, allowing the animal to become paralyzed and then slaughtering the animal while in a paralyzed state.

In the preferred modification of this invention the metabolizable drug utilized is a succinyl choline halide, with succinyl choline chloride preferred.

In carrying out the instant method, when succinyl choline chloride is employed as the metabolizable paralyzing drug, it is preferable to utilize from 2 mgs. to 5 mgs. per hundred pounds of body weight of the animal to be slaughtered, with the preferred quantity being 3 mgs. per hundred pounds of body weight.

When succinyl choline chloride is used as set forth above, it is preferable to dissolve the drug in water before injecting said drug into the animal. After injection paralysis generally takes place within 3 minutes to 20 minutes, depending upon the quantity of the drug used. If approximately 2 mgs. of succinyl choline chloride per hundred pounds of body weight are utilized, paralysis will take place in approximately 20 minutes, while when 5 mgs. of succinyl choline chloride are similarly used, paralysis will take place in approximately 3 minutes.

Succinyl choline chloride, the preferred drug used in the method of this invention, is not a conventional anesthetic and, for that reason, the heart muscles of the animal are not affected. In the doses used in the instant method, however, the diaphramatic and intercostal muscles of the animal responsible for breathing are paralyzed, thus resulting in cerebral anoxia, and thus unconsciousness.

For this reason the animal cannot feel pain when slaughtered but, at the same time, since the heart muscles are unaffected by the action of the drug, complete bleed-out of the carcass occurs, thus resulting in a superior quality of meat.

The invention will be further described by reference to specific examples of the practice thereof.

Example 1

An 800 pound steer was prepared for slaughtering by injecting said steer with a water solution of succinyl choline chloride. The solution utilized contained 24 mgs. of succinyl choline chloride. Within 5 minutes the animal was unconscious but its heart continued to beat strongly. The throat of the animal was then cut by conventional methods. No symptoms of pain were observed.

Example 2

A 700 pound steer was prepared for slaughtering by injecting said steer with a water solution of succinyl choline chloride containing 35 mgs. of the drug. Within 3 minutes the animal lost consciousness. The animal was thereafter dispatched by conventional methods without any symptoms of pain being observed.

Example 3

A 900 pound steer was prepared for slaughtering by being injected with a water solution of succinyl choline chloride containing 18 mgs. of the drug. Within 20 minutes the animal lost consciousness and was dispatched by conventional methods without any symptons of pain being observed.

The foregoing specific examples of the instant invention as set forth in the specification herein are for illustrative purposes and for purposes of example only. Various changes and modifications may obviously be made within the spirit and scope of this invention and would occur to those skilled in this art.

We claim:

1. A method of slaughtering an animal comprising the steps of injecting said animal with a water solution of succinyl choline chloride containing from 2 mgs. to 5 mgs. per hundred pounds of body weight of the animal to be slaughtered, waiting for a period of from 3 minutes to 20 minutes until said animal becomes paralyzed, and then slaughtering the animal while still alive but in a paralyzed state.

2. A method of slaughtering an animal comprising the steps of injecting said animal with a solution of a succinyl choline halide containing a sufficient quantity to paralyze the animal to be slaughtered, waiting until said animal becomes paralyzed, and then slaughtering the animal while still alive but in a paralyzed state.

3. A method of slaughtering an animal comprising the step of injecting said animal with a water solution of succinyl choline halide containing from 2 mgs. to 5 mgs. per hundred pounds of body weight of the animal to be slaughtered, waiting for a period of from three minutes to twenty minutes until said animal becomes paralyzed, and then slaughtering the animal while still alive but in a paralyzed state.

References Cited in the file of this patent

UNITED STATES PATENTS

| | | |
|---|---|---|
| 2,185,949 | Regensburger | Jan. 2, 1940 |
| 2,526,037 | Murphy | Oct. 17, 1950 |

OTHER REFERENCES

Osol-Farrar: Dispensatory of the United States of America, 25th edition, part I, Mannitol Injection of Zinc Undecylenate, pages 1341–1342.